United States Patent
Lu et al.

(10) Patent No.: US 12,180,666 B2
(45) Date of Patent: Dec. 31, 2024

(54) DEVICE AND METHOD FOR HEALTH DIAGNOSIS OF SUBGRADE SERVICE PERFORMANCE

(71) Applicant: INSTITUTE OF ROCK AND SOIL MECHANICS, CHINESE ACADEMY OF SCIENCES, Hubei (CN)

(72) Inventors: Zheng Lu, Wuhan (CN); Chuxuan Tang, Wuhan (CN); Hailin Yao, Wuhan (CN); Jie Liu, Wuhan (CN); Yongxiang Zhan, Wuhan (CN); Xingwen Luo, Wuhan (CN); Mingliang Yang, Wuhan (CN); Yang Zhao, Wuhan (CN)

(73) Assignee: INSTITUTE OF ROCK AND SOIL MECHANICS, CHINESE ACADEMY OF SCIENCES, Wuhan (CN)

( * ) Notice: Subject to any disclaimer, the term of this patent is extended or adjusted under 35 U.S.C. 154(b) by 0 days.

(21) Appl. No.: 17/801,768

(22) PCT Filed: Oct. 26, 2021

(86) PCT No.: PCT/CN2021/126510
§ 371 (c)(1),
(2) Date: Aug. 23, 2022

(87) PCT Pub. No.: WO2022/267281
PCT Pub. Date: Dec. 29, 2022

(65) Prior Publication Data
US 2024/0218626 A1    Jul. 4, 2024

(30) Foreign Application Priority Data
Jun. 21, 2021   (CN) .......................... 202110687759.1

(51) Int. Cl.
*G01V 1/30* (2006.01)
*E02D 1/08* (2006.01)

(52) U.S. Cl.
CPC ............... *E02D 1/08* (2013.01); *G01V 1/306* (2013.01)

(58) Field of Classification Search
CPC ........... E02D 1/08; G01V 1/306; G06F 30/27; G06F 17/12; G06F 2119/14
(Continued)

(56) References Cited

U.S. PATENT DOCUMENTS 9,261,354 B1 * 2/2016 Mercado ................ G01B 11/16

FOREIGN PATENT DOCUMENTS

| CN | 101684631 A | 3/2010 |
| CN | 109356009 A | 2/2019 |

(Continued)

OTHER PUBLICATIONS

Li, Qifu, "Nondestructive Testing of Road Structure and Dynamic Strength," Journal of Xi'an University of Highway, Jun. 1991, vol. 11, No. 2, pp. 33-39.
(Continued)

*Primary Examiner* — Robert R Raevis
(74) *Attorney, Agent, or Firm* — Oliff PLC

(57) ABSTRACT

A device and method for health diagnosis of subgrade service performance, including: a loading device, which applies a load to a road; a data acquisition device, which collects stress and vertical displacement generated by a pavement layer when a load is applied; a data analysis device, that performs a frequency spectrum analysis on a vertical displacement signal to obtain a propagation speed of a Rayleigh wave of a pavement layer and a thickness of the pavement layer, and thereby obtains an elastic modulus of the pavement layer; inputting the stress, vertical displace-
(Continued)

ment, elastic modulus and thickness of pavement layer into a trained subgrade soil modulus calculation model to obtain an elastic modulus of subgrade soil; and obtaining a dynamic deformation value of the subgrade under a standard load, and evaluating a health state of the subgrade according to the dynamic deformation value.

8 Claims, 2 Drawing Sheets

(58) Field of Classification Search
USPC .......................... 73/84, 781, 784; 702/33, 43
See application file for complete search history.

(56) References Cited

FOREIGN PATENT DOCUMENTS

| CN | 110983888 A | 4/2020 |
|---|---|---|
| CN | 112127342 A | 12/2020 |
| CN | 112347541 A | 2/2021 |
| CN | 113408204 A | 9/2021 |
| JP | 2004-332400 A | 11/2004 |

OTHER PUBLICATIONS

Gao, Suyun, "Inverse calculation of dynamic response and modulus of two-layer system under LWD loading," Master Thesis, Hunan University, May 25, 2018.

Lu et al., "Structural analysis and design method of dynamic deformation of expressway subgrade," Rock and Soil Mechanics, Sep. 2010, vol. 31, No. 9, pp. 2907-2912.

Apr. 28, 2022 Office Action issued in Chinese Patent Application No. 202110687759.1.

Zuo, Kun "Research on effect of new-built high-speed railway on adjacent operating railway subgrade in service status," China Doctoral Dissertation Full-text Database (Engineering Science and Technology II)Dec. 15, 2014, Issue 12.

Jan. 19, 2022 International Search Report issued in International Patent Application No. PCT/CN2021/126510.

\* cited by examiner

DEVICE AND METHOD FOR HEALTH DIAGNOSIS OF SUBGRADE SERVICE PERFORMANCE

CROSS-REFERENCES TO RELATED APPLICATIONS

This application claims priority benefits to Chinese Patent Application No. 202110687759.1, filed 21 Jun. 2021, the contents of which are incorporated herein by reference.

TECHNICAL FIELD

The present invention relates to the technical field of health diagnosis of subgrade service performance, in particular to a device and method for health diagnosis of subgrade service performance.

BACKGROUND

Information of the related art part is merely disclosed to increase the understanding of the overall background of the present invention but is not necessarily regarded as acknowledging or suggesting, in any form, that the information constitutes the prior art known to a person of ordinary skill in the art.

The subgrade is one of the most important components of road structure and determines the long-term service performance of the road. Under the influence of natural factors such as rainfall, evaporation, temperature fluctuation and the increasing traffic load, the performance of the subgrade will gradually deteriorate, thereby causing subsidence and cracking of the pavement structure, and finally disabling the road structure. Often, repair occurs before the pavement structure is damaged, such as after cracking. If the weak road section can be diagnosed in time in the early stage of the degradation of the subgrade, reinforcement treatment such as grouting is carried out, and the failure of the road structure and the damage of the pavement structure can be effectively avoided.

Currently, there are some deficiencies in existing methods for evaluating road performance by using methods such as core drilling method, Beckman beam method, falling weight deflectometer (FWD) method and the like. Although the core drilling method can detect the performance change of road structures of different layers, this is a destructive detection, which can damage the road, and has a low efficiency and a high cost, and can inevitably cause disturbance to the sample during sampling.

The Beckman beam method requires the use of a standard vehicle of double axle and four wheels on both sides of the rear axle, and the rebound bending of the subgrade surface is tested by using a pavement bending instrument composed of a Beckman beam, a dial indicator and a meter frame. This method requires the standard vehicle to drive while traveling at a slower speed while measuring the rebound deflection, and dividing the load of the rear axle of the standard vehicle by the deflection value to obtain the rebound modulus of the road. This actually results in a static rebound modulus of the road, cannot reflect the dynamic performance of the subgrade, and may generate a large error when the dial indicator is manually reading the deflection value, and more personnel need to be tested at the same time. After the road is built, the rebound modulus value measured by the Beckman beam method is the overall performance of the road, including the pavement and the subgrade, and cannot reflect the health condition of the subgrade separately.

The FWD method calculates the rebound modulus of the road by dropping the hammer and recording the impact force and the displacement at the hammer strike, which can continuously collect the deflection data of the road. This test method usually requires a vehicle, the cost is high, the measured rebound modulus is also the modulus of the overall structure of the road, can not reflect the health status of the subgrade alone.

The Beckman beam method test obtains the rebound value of the pavement when the standard axle load vehicle load leaves, and the FWD test obtains the maximum deformation value produced by the pavement under impact loading. Both methods are based on the theoretical solution of a uniform elastic half-space under static load, and the dynamic rebound modulus of the road is inverted by the data collected. However, on the one hand, in fact, the road is a typical layered structure, the pavement and subgrade properties are very different, and the subgrade is compacted in layers during filling. On the other hand, the subgrade soil is usually in the unsaturated solid-liquid-gas three-phase state at the same time, and the presence of liquid and gas has a great influence on the mechanical properties of the soil. The elastic half-space model completely ignores the multiphase nature of the soil medium, which generates inevitable errors in the computational inversion.

Therefore, the inventor believes that the existing road performance evaluation methods cannot perform non-destructive and rapid health detection on the road subgrade.

SUMMARY

For solving the above problems, the present disclosure provides a device and method for health diagnosis of subgrade service performance, and rapid non-destructive detection of the health state of the subgrade is realized.

For achieving the above purpose, the disclosure adopts the following technical solutions:

In a first aspect, there provides a device of health diagnosis for subgrade service performance, comprising:
    a loading device, configured to apply a load to a road;
    a data acquisition device, configured to collect stress and a vertical displacement generated by a pavement (pavement layer) when a load is applied to a road;
    a data analysis device, configured to perform a frequency spectrum analysis on a vertical displacement signal to obtain a propagation speed of a Rayleigh wave of a pavement layer and a thickness of the pavement layer, and obtain an elastic modulus of the pavement layer according to the propagation speed; inputting the stress, the vertical displacement, the elastic modulus of the pavement layer and the thickness of pavement layer into a trained subgrade soil modulus calculation model to obtain an elastic modulus of subgrade soil; and according to the elastic modulus of the pavement layer, the elastic modulus of subgrade soil and the thickness of the pavement layer, obtaining a dynamic deformation value of the subgrade under a standard load, and evaluating a health state of the subgrade according to the dynamic deformation value of the subgrade under the standard load.

In a second aspect, there provides a method for health diagnosis of subgrade service performance, comprising:
    collecting stress and a vertical displacement generated by a pavement (pavement layer) when a load is applied to a road;

performing a frequency spectrum analysis on a vertical displacement signal to obtain a propagation speed of a Rayleigh wave of a pavement layer and a thickness of the pavement layer;

obtaining an elastic modulus of the pavement layer according to the propagation speed;

inputting the stress, the vertical displacement, the elastic modulus of the pavement layer, and the thickness of the pavement layer into a trained subgrade soil modulus calculation model to obtain an elastic modulus of subgrade soil;

obtaining a dynamic deformation value of the subgrade under a standard load according to the elastic modulus of the pavement layer, the elastic modulus of subgrade soil, and the thickness of the pavement layer; and evaluating a health state of the subgrade according to the dynamic deformation value of the subgrade under the standard load.

In a third aspect, there provides an electronic device, comprising a memory, a processor, and a computer instruction stored on the memory and running on the processor; wherein, when the computer instruction is run by the processor, steps of a method for health diagnosis of subgrade service performance are completed.

In a fourth aspect, there provides a computer-readable storage medium for storing a computer instruction; wherein, when the computer instruction is executed by the processor, steps of a method for health diagnosis of subgrade service performance are completed.

Compared with the prior art, the invention has the following beneficial effects:

According to the present disclosure, a load is applied to a road, a stress and a vertical displacement generated by a pavement of a road when the load is applied are collected, and a dynamic deformation value of a subgrade of the road under a standard load is obtained by analyzing the stress and the vertical displacement, so that a health state of the subgrade is diagnosed according to the dynamic deformation value of the subgrade under the standard load, and rapid non-destructive detection of the health state of the subgrade is realized.

Advantages of additional aspects of the present invention will be described below, or will become apparent from the following description, or will be learned through the practice of the present invention.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention and do not constitute an improper limitation of the present invention.

Figure 1:
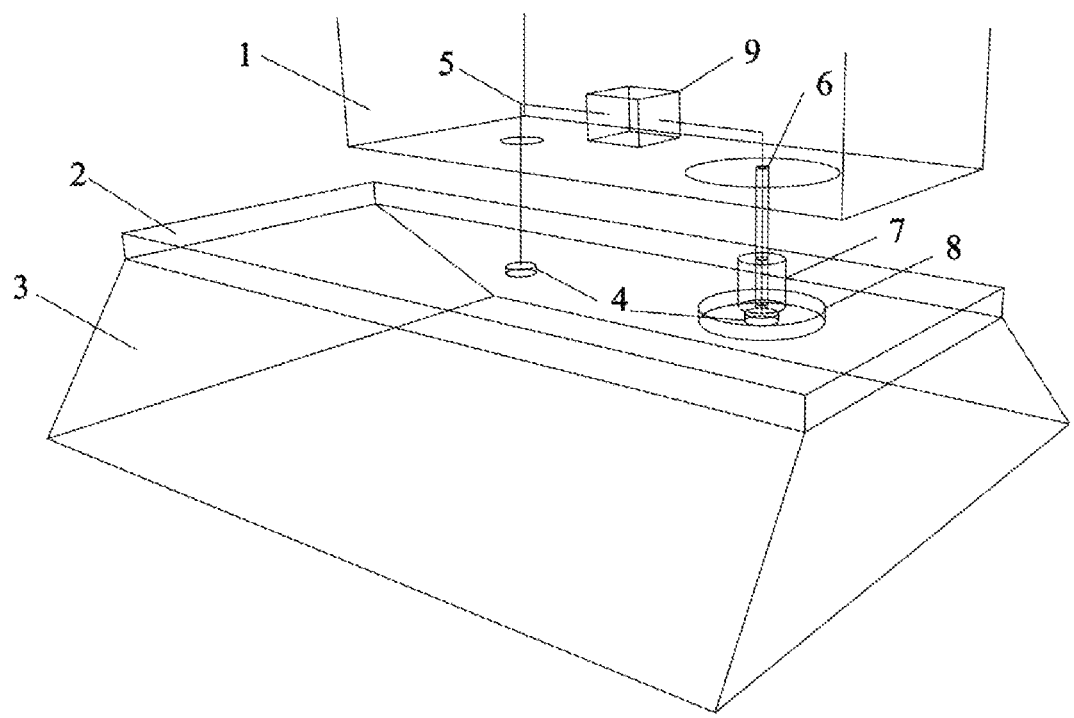
FIG. 1 is a schematic diagram of an overall structure of a device according to Example 1 of the present disclosure.

Wherein: 1, test vehicle; 2, pavement; 3, subgrade; 4, displacement sensor; 5, synchronous lead; 6, guide rod of falling weight; 7, falling weight; 8, buffer steel disc; 9, data analysis device.

DETAILED DESCRIPTION

The present disclosure will be further described below with reference to the accompanying drawings and examples.

It should be noted that the following detailed description is illustrative and is intended to provide further explanation of the present application. Unless otherwise specified, all technical and scientific terms used herein have the same meanings as those usually understood by a person of ordinary skill in the art to which the present application belongs.

It should be noted that the terms used herein are merely used for describing specific implementations, and are not intended to limit exemplary implementations of the present disclosure. As used herein, the singular form is also intended to include the plural form unless the context dictates otherwise. In addition, it should further be understood that the terms "comprise" and/or "comprising" used in this specification indicate that there are features, steps, operations, devices, components, and/or combinations thereof.

For description, if the words "upper", "lower", "left", and "right" appear in this application, they only mean that they are consistent with the up, down, left and right directions of the drawings themselves, and does not limit the structure, but is only to describe the invention and simplify the description and does not indicate or imply that the equipment or components referred to must have a specific orientation, be constructed and operated in a specific orientation, and therefore cannot be construed as a limitation of this application. In addition, the terms "first", "second", "third", and "fourth" are used for descriptive purposes only and cannot be construed as indicating or implying relative importance.

Explanation of terms: the terms "fix", "connect with", "connect to" and other terms in the present application shall be understood in a broad sense. For example, it can be a fixed connection, a detachable connection, or an integrated one; it can be a mechanical connection or an electrical connection, a direct connection or an indirect connection through an intermediate medium, an internal connection of two components, or an interactive relationship between two components. For those skilled in the art, the specific meaning of the above terms in the invention can be understood according to the specific situation.

Example 1

For realizing a rapid non-destructive detection of the health state of a subgrade, the example provides a device for health diagnosis of subgrade service performance, comprising:

a loading device, configured to apply a load to a road;

a data acquisition device, configured to collect stress and a vertical displacement generated by a pavement (layer) when a load is applied to a road;

a data analysis device, configured to perform a frequency spectrum analysis on a vertical displacement signal to obtain a propagation speed of a Rayleigh wave of a pavement layer and a thickness of the pavement layer, and obtain an elastic modulus of the pavement layer according to the propagation speed; inputting the stress, the vertical displacement, the elastic modulus of the pavement layer and the thickness of pavement layer into a trained subgrade soil modulus calculation model to obtain an elastic modulus of subgrade soil; and according to the elastic modulus of the pavement layer, the elastic modulus of subgrade soil and the thickness of the pavement layer, obtaining a dynamic deformation value of the subgrade under a standard load, and evaluating a health state of the subgrade according to the dynamic deformation value of the subgrade under the standard load.

Further, the loading device comprises a testing vehicle, a falling weight capable of free-fall, and a buffer steel disc arranged on the testing vehicle, wherein, the falling weight falls on the buffer steel disc when falling freely.

Further, the buffer steel disc is connected with the testing vehicle through a retractable falling weight guide rod, and the falling weight falls freely along the falling weight guide rod onto the buffer steel disc.

Further, the data acquisition device comprises a position sensor arranged on the testing vehicle and capable of falling down and retracted, and a stress sensor arranged on the buffer steel disc.

Further, the dynamic deformation value of the subgrade under the standard load is compared with the allowed dynamic deformation value of the top surface of the subgrade, and the health state of the subgrade is evaluated.

Further, a training sample is formed according to the elastic modulus of pavement layer, the elastic modulus of subgrade soil, the thickness of pavement layer, the stress of pavement layer and the vertical displacement of pavement layer of the sample road, and a subgrade soil modulus calculation model is trained to obtain a trained subgrade soil modulus calculation model.

Further, the vertical displacement of the pavement in the training sample is obtained by inputting the stress generated by the pavement into a double-layer unsaturated poroelastic model.

Further, subgrade soil modulus calculation model adopts a neural network model.

The device for health diagnosis of subgrade service performance according to the example will be described in detail with FIGS. 1 to 3.

The device for health diagnosis of subgrade service performance comprises the loading device, the data acquisition device, and the data analysis device.

As shown in FIG. 1, the loading device comprises the testing vehicle 1, the falling weight 7, and the buffer steel disc 8 which are arranged on the testing vehicle.

The falling weight 7 can fall freely from the testing vehicle 1, the buffer steel disc 8 is connected with the testing vehicle 1 through the falling weight guide rod 6, and the falling weight guide rod 6 is telescopic and can extend out and retract relative to the testing vehicle, and the extension of the falling weight guide rod 6 drives the buffer steel disc 8 to extend out or retract relative to the testing vehicle.

The falling weight 7 falls freely along the falling weight guide rod 6 onto the buffer steel disc 8.

The data acquisition device comprises the displacement sensor 4 arranged on the testing vehicle 1 and the stress sensor arranged on the buffer steel disc 8.

The displacement sensor 4 can be extended and retracted from the testing vehicle 1.

The data analysis device 9 is arranged on testing vehicle 1 and is connected with the displacement sensor 4 and the stress sensor through a synchronous wire 5.

When performing the test on the road, testing vehicle 1 is driven to a predetermined position on the road, and the displacement sensor 4, the falling weight guide rod 6, and the buffer steel disc 8 are released from the test vehicle.

The falling weight 7 is released to do free-fall and is smashed on the buffer steel disc 8 to excite the road.

When the falling weight 7 is smashed on the buffer steel disc 8, the vertical displacement generated by the road is collected by the displacement sensor 4, and the stress generated by the road is collected by the stress sensor.

The vertical displacement and the stress generated by the road are sent to the data analysis device 9 and analyzed through the data analysis device 9, then the health state of the subgrade is evaluated. When the health state of the subgrade soil is poor, an alarm is sent out to prompt that the health state of the subgrade soil is poor and measures are needed to be taken for reinforcement in time.

Figure 2:
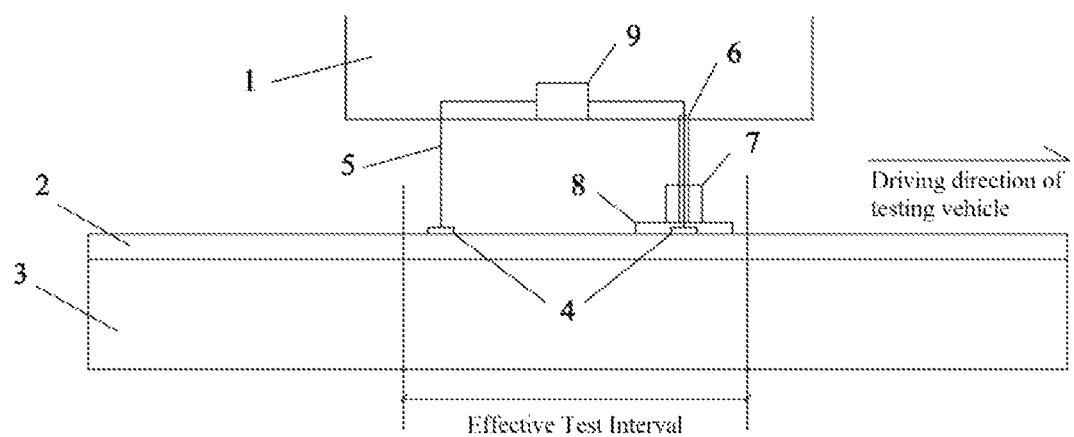
FIG. 2 is a schematic diagram of a test process of a device for testing a road according to Example 1 of the present disclosure.
Figure 3:
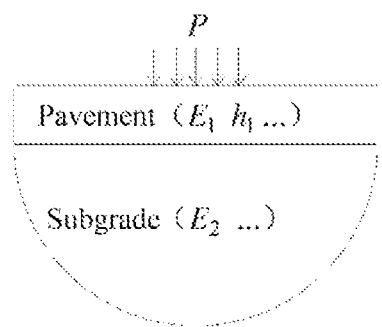
FIG. 3 is a schematic diagram of a double-layer unsaturated poroelastic model according to Example 1 of the present disclosure.

When the measurement at the road is completed, as shown in FIG. 2, the displacement sensor 4, the falling weight 7, the falling weight guide rod 6, and the buffer steel disc 8 are retracted into the testing vehicle, the testing vehicle is driven out of the effective measurement area, then is driven to the next test section for testing, so that the evaluation of the health state of the whole subgrade is realized.

The data analysis device 9 analyzing the vertical displacement and the stress to obtain the evaluation result of the health state of the subgrade, and the specific process is as follows:

S1: performing frequency spectrum analysis on the vertical displacement signal obtained by the displacement sensor 4 to obtain a dispersion curve of the test section, so as to obtain the propagation speed $V_R$ of the Rayleigh wave of the pavement layer and the thickness of pavement layer $h_1$, and obtain the elastic modulus of pavement layer $E_1$ by using the propagation speed $V_R$.

Wherein, a calculation formula of the elastic modulus of the pavement layer $E_1$ is:

$$E_1 = \frac{2\rho(1+v)^3 V_R^2}{(0.87+1.12v)^2 \times 10^6} \tag{1}$$

wherein, $\rho$ is the density of the pavement medium, v is the Poisson's ratio of the pavement medium.

S2: inputting the stress P, the vertical displacement $u_z^0$, the elastic modulus of pavement layer $E_1$, and the thickness of pavement layer $h_1$ into the trained subgrade soil modulus calculation model to obtain the elastic modulus of subgrade soil $E_2$.

Wherein, the subgrade soil modulus calculation model adopts a neural network model or a machine learning algorithm, and is as follows:

$$f(P, E_1, h_1, u_{z,1}^0, u_{z,2}^0 \ldots) \to E_2 \tag{2}$$

A training sample is formed according to the elastic modulus of pavement layer, the elastic modulus of subgrade soil, the thickness of pavement layer, the stress of pavement layer and the vertical displacement of pavement layer of the sample road, and a subgrade soil modulus calculation model is trained to obtain a trained subgrade soil modulus calculation model.

The vertical displacement of the pavement in the training sample is obtained by inputting the stress generated by the pavement into a double-layer unsaturated poroelastic model specifically is:

Under the axial symmetric vertical impact load of the falling weight, an issue of the dynamic response of subgrade can be simplified into a spatial axial symmetric model. For the convenience of explanation, the double-layer model as shown in FIG. 3 is taken as an example. Based on the governing equations of unsaturated poroelastic media as shown in equation (4), the stress-displacement relationship of the double-layer unsaturated poroelastic model can be obtained by using an accurate stiffness matrix method and an integral transformation method:

$$\{\tilde{\bar{U}}\} = [B]\{\tilde{\bar{\Sigma}}\} \quad (3)$$

Wherein $\{\tilde{\bar{U}}\}$ is the displacement on the interface of each layer in the integral transform domain; $\{\tilde{\bar{\Sigma}}\}$ is the stress on the interface of each layer in the integral transform domain; [B] is the global flexibility matrix for the two-layer model, which can be derived from the governing equation (4) for unsaturated porous medium using the exact stiffness matrix method and the integral transform method.

$$\begin{cases} \sigma_{ij} = 2\mu\varepsilon_{ij} + \lambda\delta_{ij}e - \delta_{ij}ap \\ \sigma_{ij,j} = \rho\ddot{u}_i + \rho_w\ddot{W}_i + \rho_a\ddot{V}_i \\ -p_{,i}^w = \rho_w\ddot{u}_i + \frac{\rho_w}{nS_r}\ddot{W}_i + \frac{\rho_a g}{k_a}\dot{W}_i \\ -p_{,i}^a = \rho_a\ddot{u}_i + \frac{\rho_a}{n(1-S_r)}\ddot{V}_i + \frac{\rho_a g}{k_a}\dot{V}_i \\ A_{11}\dot{p}^w + A_{12}\dot{p}^a + A_{13}\nabla\cdot\dot{u} + A_{14}\nabla\cdot\dot{V} = 0 \\ A_{21}\dot{p}^w + A_{22}\dot{p}^a + A_{23}\nabla\cdot\dot{u} + A_{24}\nabla\cdot\dot{W} = 0 \end{cases} \quad (4)$$

Wherein, $\sigma_{ij}$ represents a total stress;

$$\rho = (1-n)\rho_s + nS_r\rho_w + n(1-S_r)\rho_a$$

is a total density of unsaturated porous medium; n is a porosity of soil mass; $S_r$ is a saturation; $\rho_s$, $\rho_w$ and $\rho_a$ are material densities of each phase of medium respectively; (•) denotes the derivative for time; displacement components of pore water and pore gas relative to soil particles in a direction i are $W_i$ and $V_i$; g is the acceleration of gravity; $k_w$ and $k_a$ are permeability coefficients of the pore water and the pore gas respectively; $\delta_{ij}$ is a Kronecker symbol; p is an average pore pressure acting around the soil particle; $\lambda$ and $\mu$ are Lame constants; the first Biot coefficient $a=1-K_b/K_s$, $K_b$ and $K_s$ are respectively the bulk compression modulus of the soil skeleton and the bulk compression modulus of the soil particle, and there are $K_b=\lambda+2\mu/3$ and $K_b<<K_s$; $e=\nabla\cdot u$ is a body strain, u is a soil particle displacement vector; $\varepsilon_{ij}$ is a strain tensor;

$$A_{11} = nA_s + (1-S_r)\frac{a\chi - nS_r}{K_s},$$

$$A_{12} = (1-S_r)\left[\frac{a(1-\chi) - n(1-S_r)}{K_s} + \frac{n}{K_a}\right] - nA_s,$$

$$A_{13} = (1-S_r)\left(1 - \frac{K_b}{K_s}\right), A_{14} = 1, A_{21} = \frac{(a\chi - nS_r)S_r}{K_s} - nA_s + \frac{nS_r}{K_w},$$

$$A_{22} = \frac{[a(1-\chi) - n(1-S_r)]S_r}{K_s} + nA_s,$$

$$A_{23} = \left(1 - \frac{K_b}{K_s}\right)S_r, A_{24} = 1, A_s = -\alpha md(1-S_{w0})(S_e)^{\frac{m+1}{m}}\left[(S_e)^{-\frac{1}{m}} - 1\right]^{\frac{d-1}{d}};$$

$\alpha$, m and d are fit parameters of that soil-water characteristic curve model; Se is the effective saturation.

Performing integral transformation on the stress generated by the pavement of sample road collected by the stress sensor on the buffer steel disc 8 to obtain the stress $\{\tilde{\bar{\Sigma}}\}$, and inputting the stress into the double-layer unsaturated poroelastic model expressed by the formula (3) to obtain the vertical displacement of the pavement.

Since different layers in the double-layer unsaturated poroelastic model have different mechanical parameters, according to the actual sample road structure as well as the requirements of the specification, a large number of combinations $PE_1\ E_2\ h_1$ are taken for each mechanical parameter within a possible range for the calculation of the vertical displacement of the pavement to obtain the vertical displacement at the same position as displacement sensor 4 at the top surface of the road, for example, the $$u_{z,1}^0, u_{z,2}^0.$$

S3: obtaining a dynamic deformation value $u_z$ of subgrade under the standard load through the elastic modulus $E_1$ of pavement lay, the elastic modulus $E_2$ of subgrade soil, and the thickness $h_1$ of pavement layer, wherein the calculation formula of the dynamic deformation value $u_z$ of subgrade under the standard load is as follows.

$$u_z = \frac{1}{4\pi^2}\int_{-\infty}^{\infty}\int_{-\infty}^{\infty}\left(\left[-v_{p2}e^{-v_{p2}z_1}A_2 + v_{p2}e^{v_{p2}z_1}B_2 + (v_{s2}^2 - \gamma_{s2}^2)e^{-v_{s2}z_1}C_2 + (v_{s2}^2 - \gamma_{s2}^2)e^{v_{s2}z_1}D_2\right]e^{i(\beta x + \gamma y)}\right)d\beta d\gamma \quad (5)$$

wherein:

$$v_{p2}^2 = \beta^2 + \gamma^2 + \gamma_{p2}^2; v_{s2}^2 = \beta^2 + \gamma^2 + \gamma_{s2}^2;$$

$$\gamma_{p2}^2 = \frac{\alpha}{c_{p2}^2}; \gamma_{s2}^2 = \frac{\alpha}{c_{s2}^2}; c_{p2} = \sqrt{\frac{\lambda_2 + 2G_2}{\rho_2}};$$

$$c_{s2} = \sqrt{\frac{G_2}{\rho_2}}; \alpha = -\omega^2 + 2V\omega\beta - V^2\beta^2;$$

$$G_2 = \frac{E_2}{2(1+v)}; \lambda_2 = \frac{Ev}{(1+v)(1-2v)};$$

V and ω respectively are the speed and a vibration frequency of the testing vehicle; β and γ are integral transformation parameters; $A_2$, $B_2$, $C_2$, and $D_2$ are integral constants.

S4: evaluating the health state of the subgrade according to the dynamic deformation value $u_z$ of the subgrade under the standard load.

Specifically: the dynamic deformation value $u_z$ of the subgrade under the standard load is compared with the allowed dynamic deformation value $u_{dr}$ of the top surface of the subgrade, and the health state of the subgrade is evaluated.

When $u_z > u_{dr}$, the current test position is automatically recorded, and an alarm is sent to indicate that the health condition of the subgrade soil is poor, and timely measures need to be taken to reinforce.

Wherein, the allowed dynamic deformation value $u_{dr}$ of the top surface of subgrade is as follows:

$$u_{dr} = 600 N_c^{-0.2} A_c A_s A_b A_a \qquad (6)$$

wherein, $A_c$, $A_s$ and $A_b$ are coefficients related to highway class, types, and properties of the structural layer, $A_a$ is a ratio of the amplitude of dynamic deformation of the top surface of subgrade to the amplitude of dynamic deformation of pavement.

According to the present disclosure, the load is applied to the road, the stress and the vertical displacement generated by the pavement are collected when the load is applied, and the dynamic deformation value of subgrade under the standard load is obtained through the analysis of the stress and the vertical displacement, the health state of the subgrade is diagnosed according to the dynamic deformation value of subgrade under the standard load, and the rapid non-destructive detection of the health state of the subgrade is realized.

In addition, displacement sensor 4 in the example may be replaced by a speed sensor or an acceleration sensor, and when a speed sensor or a acceleration sensor is used, the signal collected by the sensor needs to be subjected to time integral to obtain a displacement signal, and then the displacement signal is analyzed to obtain the dynamic deformation value of the subgrade under the standard load.

Example 2

The example discloses a method for health diagnosis of subgrade service performance, comprising:
collecting stress and vertical displacement generated by a pavement (layer) when a load is applied to the road;
performing a frequency spectrum analysis on a vertical displacement signal to obtain a propagation speed of a Rayleigh wave of the pavement layer and a thickness of the pavement layer;
obtaining an elastic modulus of the pavement layer according to the propagation speed;
inputting the stress, the vertical displacement, the elastic modulus of the pavement layer, and the thickness of the pavement layer into a trained subgrade soil modulus calculation model to obtain an elastic modulus of subgrade soil;
obtaining a dynamic deformation value of subgrade under a standard load according to the elastic modulus of pavement layer, the elastic modulus of subgrade soil, and the thickness of pavement layer; and
evaluating the health state of the subgrade according to the dynamic deformation value of the subgrade under the standard load.

Example 3

The example discloses an electronic device, comprising a memory, a processor, and computer instructions stored on the memory and running on the processor; wherein, when the computer instructions are executed by the processor, steps of a method for health diagnosis of subgrade service performance disclosed in the Example 2 are completed.

Example 4

The example discloses a computer-readable storage medium, for storing computer instructions; wherein, when the computer instructions are executed by the processor, steps of a method for health diagnosis of subgrade service performance disclosed in the Example 2 are completed.

The foregoing descriptions are merely preferred embodiments of the present invention but are not intended to limit the present invention. A person skilled in the art may make various alterations and variations to the present invention. Any modification, equivalent replacement, or improvement made within the spirit and principle of the present invention shall fall within the protection scope of the present invention.

Those skilled in the art should understand that embodiments of the present application may be provided as methods, systems, or computer program products. Therefore, the present application may take the form of a complete hardware embodiment, a complete software embodiment, or an embodiment combining software and hardware. Further, the present application may take the form of a computer program product implemented on one or more computer-usable storage media (including but not limited to a disk memory, CD-ROM, optical memory, etc.) containing computer-usable program codes.

The present application is described with reference to the flow chart and/or block diagram of the method, equipment (system), and computer program product according to the embodiment of the present application. It should be understood that each process and/or block in the flowchart and/or block diagram and the combination of processes and/or blocks in the flowchart and/or block diagram can be realized by computer program instructions. These computer program instructions may be provided to the processor of a general-purpose computer, special-purpose computer, embedded processor, or other programmable data processing device to generate a machine, so that the instructions executed by the processor of the computer or other programmable data processing device generate a device for realizing the functions specified in one or more processes of the flowchart and/or one or more blocks of the block diagram.

These computer program instructions can also be stored in a computer-readable memory that can guide the computer or other programmable data processing device to work in a specific way so that the instructions stored in the computer-readable memory generate a manufacturing product including an instruction device, which implements the functions specified in one or more processes of the flowchart and/or one or more blocks of the block diagram.

These computer program instructions can also be loaded onto a computer or other programmable data processing device so that a series of operation steps are performed on the computer or other programmable device to produce computer-implemented processing so that the instructions executed on the computer or other programmable device provide steps for realizing the functions specified in one or more processes of the flowchart and/or one or more blocks of the block diagram.

Finally, it should be noted that: the above embodiments are only used to illustrate the technical scheme of the invention rather than limit it. Although the invention is described in detail with reference to the above embodiments, those skilled in the art should understand that the specific embodiment of the invention can still be modified or equivalent replaced without any modification or equivalent replacement divorced from the spirit and scope of the invention, all of them shall be within the scope of protection of the claims of the invention.

What is claimed is:

1. A device for health diagnosis of subgrade service performance, comprising:
   a loading device, configured to apply a load to a road;
   a data acquisition device, configured to collect stress and a vertical displacement of a pavement layer of the road when the load is applied to the road;
   a data analysis device, configured to
      perform a frequency spectrum analysis on a signal of the vertical displacement to obtain a propagation speed of a Rayleigh wave in a pavement layer of the road and a thickness of the pavement layer of the road, and obtain an elastic modulus of the pavement layer of the road according to the propagation speed of the Rayleigh wave;
      obtain an elastic modulus of a subgrade soil of the road by inputting the stress, the vertical displacement, the elastic modulus of the pavement layer of the road and the thickness of the pavement layer of the road into a trained subgrade soil modulus calculation model;
      obtain a dynamic deformation value of the subgrade of the road under a standard load according to the elastic modulus of the pavement layer of the road, the elastic modulus of the subgrade soil of the road and the thickness of the pavement layer of the road; and
      evaluate a health state of the subgrade of the road according to the dynamic deformation value of the subgrade of the road under the standard load.

2. The device as claimed in claim 1, wherein the loading device comprises a testing vehicle, and a falling weight capable of free-fall and a buffer steel disc arranged on the testing vehicle; wherein, the falling weight is configured to fall on the buffer steel disc when the falling weight performed the free-fall.

3. The device as claimed in claim 2, wherein the buffer steel disc is connected to the testing vehicle through a retractable falling weight guide rod, and the falling weight falls freely along the falling weight guide rod onto the buffer steel disc.

4. The device as claimed in claim 2, wherein the data acquisition device comprises a position sensor arranged on the testing vehicle and is capable of falling down and being retracted, and a stress sensor arranged on the buffer steel disc.

5. The device as claimed in claim 1, wherein the data analysis device is further configured to evaluate the health state of the subgrade of the road by comparing the dynamic deformation value of the subgrade of the road under the standard load with an allowed dynamic deformation value of a top surface of the subgrade of the road.

6. The device as claimed in claim 1, wherein the subgrade soil modulus calculation model is trained using a training sample comprising:
   an elastic modulus of a pavement layer of a sample road,
   an elastic modulus of a subgrade soil of the sample road,
   a thickness of the pavement layer of the sample road,
   a stress generated on the pavement layer of the road sample, and
   a vertical displacement of the pavement layer of the sample road.

7. The device as claimed in claim 6, wherein the vertical displacement of the pavement layer of the sample road in the training sample is obtained by inputting the stress generated on the pavement layer into a double-layer unsaturated poroelastic model.

8. A method for health diagnosis of subgrade service performance, comprising:
   collecting stress and a vertical displacement of a pavement layer of a road when a load is applied to the road;
   performing a frequency spectrum analysis on a signal of the vertical displacement to obtain a propagation speed of a Rayleigh wave in a pavement layer of the road and a thickness of the pavement layer of the road;
   obtaining an elastic modulus of the pavement layer of the road according to the propagation speed of the Rayleigh wave;
   inputting the stress, the vertical displacement, the elastic modulus of the pavement layer of the road, and the thickness of the pavement layer of the road into a trained subgrade soil modulus calculation model to obtain an elastic modulus of subgrade soil of the road;
   obtaining a dynamic deformation value of the subgrade of the road under a standard load according to the elastic modulus of the pavement layer of the road, the elastic modulus of the subgrade soil of the road, and the thickness of the pavement layer of the road; and
   evaluating a health state of the subgrade of the road according to the dynamic deformation value of the subgrade of the road under the standard load.

* * * * *